United States Patent
Wei et al.

(10) Patent No.: US 11,297,066 B2
(45) Date of Patent: Apr. 5, 2022

(54) CONSTRAINED ROLES FOR ACCESS MANAGEMENT

(71) Applicant: International Business Machines Corporation, Armonk, NY (US)

(72) Inventors: Yi-hsiu Wei, Austin, TX (US); David Yu Chang, Austin, TX (US); Ching-Yun Chao, Austin, TX (US); Hui-Ming Lin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 215 days.

(21) Appl. No.: 16/747,135

(22) Filed: Jan. 20, 2020

(65) Prior Publication Data

US 2021/0226956 A1 Jul. 22, 2021

(51) Int. Cl.
  *G06F 21/00* (2013.01)
  *H04L 29/06* (2006.01)
  *H04L 41/22* (2022.01)
  *G06F 21/60* (2013.01)

(52) U.S. Cl.
  CPC .......... *H04L 63/102* (2013.01); *G06F 21/604* (2013.01); *H04L 41/22* (2013.01); *H04L 63/108* (2013.01); *H04L 63/20* (2013.01)

(58) Field of Classification Search
  CPC ....... H04L 63/102; H04L 41/22; H04L 63/20; H04L 63/108; G06F 21/604; G06F 21/6218; G06F 21/31
  See application file for complete search history.

(56) References Cited

U.S. PATENT DOCUMENTS

| 6,950,825 | B2 | 9/2005 | Chang et al. |
| 7,676,831 | B2 | 3/2010 | Britton et al. |
| 8,271,527 | B2* | 9/2012 | Frieder ............... G06F 21/6218 707/783 |

(Continued)

FOREIGN PATENT DOCUMENTS

| GB | 2487862 B | 9/2016 |
| JP | 2015087944 A | 5/2015 |

OTHER PUBLICATIONS

Strembeck, M., "Conflict Checking of Separation of Duty Constraints in RBAC—Implementation Experiences", 6 pages.

(Continued)

*Primary Examiner* — Kendall Dolly
(74) *Attorney, Agent, or Firm* — Stosch Sabo

(57) ABSTRACT

Described are techniques for an access management protocol including a method comprising associating a granted permission set and a constrained permission set to a user profile in an access management system. Respective granted permissions in the granted permission set authorize the user profile to perform the respective granted permissions, and respective constrained permissions in the constrained permission set preclude the user profile from performing the respective constrained permissions. The method further comprises receiving a permission-based request at the access management system and from the user profile and determining that the permission-based request is associated with a permission that is included in both the granted permission set and the constrained permission set. The method further comprises rejecting the permission-based request.

18 Claims, 8 Drawing Sheets

(56) References Cited

U.S. PATENT DOCUMENTS

| | | | |
|---|---|---|---|
| 8,990,950 B2 | 3/2015 | Kruger et al. | |
| 9,455,990 B2 | 9/2016 | Beedubail et al. | |
| 9,582,673 B2 | 2/2017 | Wahl | |
| 9,799,003 B2 | 10/2017 | Doran et al. | |
| 11,108,828 B1 * | 8/2021 | Curtis | H04L 63/104 |
| 2002/0026592 A1 | 2/2002 | Gavrila et al. | |
| 2007/0214497 A1 | 9/2007 | Montgomery et al. | |
| 2015/0135261 A1 * | 5/2015 | Park | H04L 63/102 |
| | | | 726/1 |
| 2020/0120098 A1 * | 4/2020 | Berg | H04L 63/104 |

OTHER PUBLICATIONS

Mell et al., "The NIST Definition of Cloud Computing", Recommendations of the National Institute of Standards and Technology, Sep. 2011, 7 pages.

* cited by examiner

CONSTRAINED ROLES FOR ACCESS MANAGEMENT

BACKGROUND

The present disclosure relates to access management, and, more specifically, to constrained roles in access management protocols.

Enterprise access management relates to controlling access permissions of various users to various data, applications, services, and/or other resources of an enterprise. Enterprise access management is useful for preserving information technology (IT) security and integrity.

SUMMARY

Aspects of the present disclosure are directed toward a method for an access management protocol, the method comprising associating a granted permission set and a constrained permission set to a user profile in an access management system, where respective granted permissions in the granted permission set authorize the user profile to perform the respective granted permissions, and where respective constrained permissions in the constrained permission set preclude the user profile from performing the respective constrained permissions. The method further comprises receiving a permission-based request at the access management system and from the user profile. The method further comprises determining, by the access management system, that the permission-based request is associated with a permission that is included in both the granted permission set and the constrained permission set. The method further comprises rejecting, by the access management system, the permission-based request.

Additional aspects of the present disclosure are directed to systems and computer program products configured to perform the method described above. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
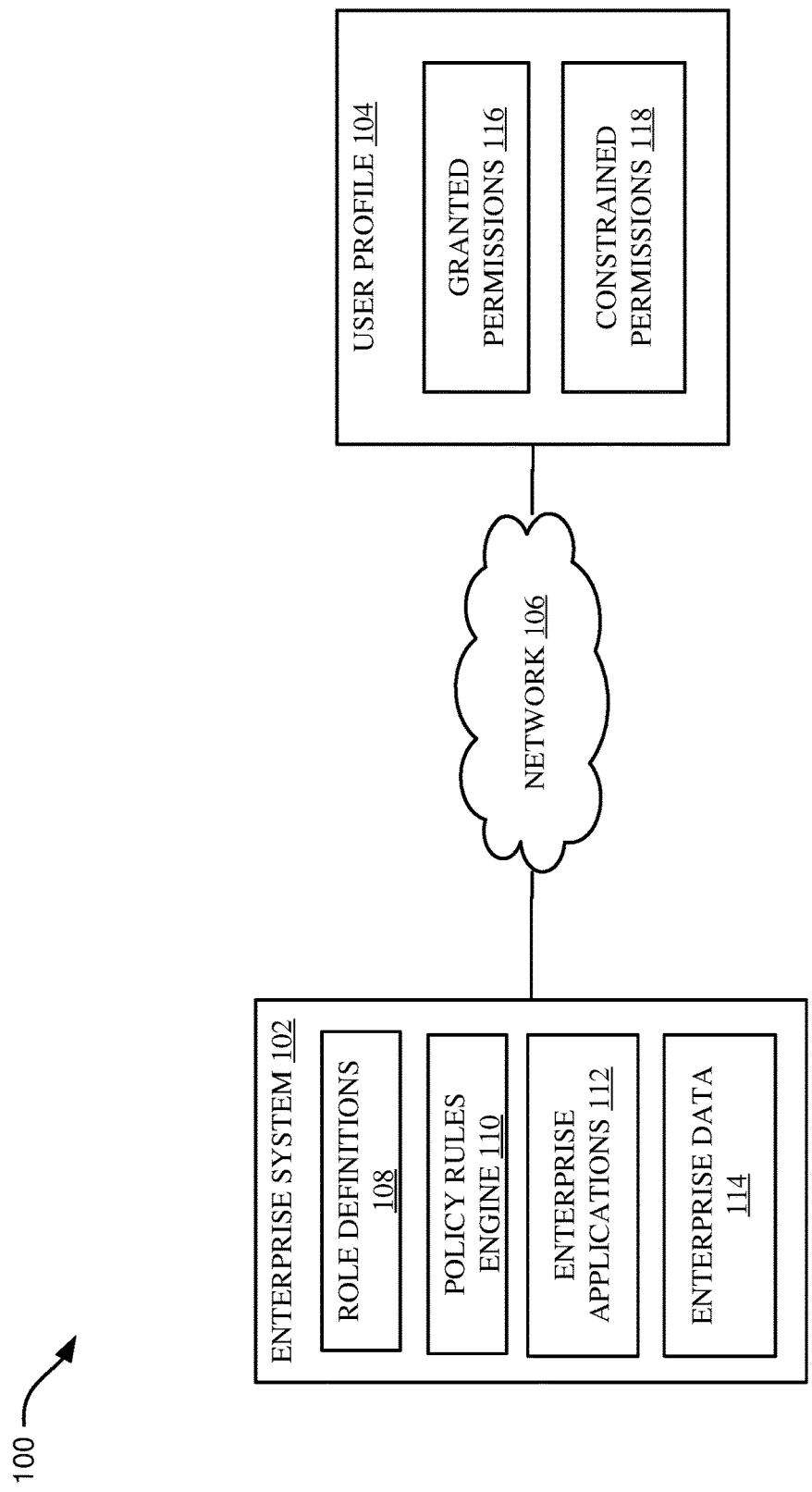
FIG. 1 illustrates a block diagram of an example access management environment, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward access management, and, more specifically, to constrained roles in access management protocols. While not limited to such applications, embodiments of the present disclosure may be better understood in light of the aforementioned context.

Access management protocols can include, for example, role-based access control (RBAC) protocols, access control lists, attribute-based access control (ABAC), organization-based access control (OrBAC), or any other access management protocol. RBAC (also referred to as role-based security) is an approach for granting access to electronic resources (e.g., data, applications, etc.) to authorized users. RBAC can include associating a role assignment, a role authorization, and a permission authorization to each user in order to define each user's access privileges. In order to be effective, access management protocols such as RBAC follow security principles such as the principle of least privilege (also referred to as the principle of minimal privilege or the principle of least authority) and the principle of separation of duties (also referred to as segmentation of duties) in order to assign a user the minimum required permissions.

Least privilege is a concept whereby a user associated with the enterprise has access to only the information and resources that are necessary for the user to successfully fulfill the user's role, goal, or objective. An enterprise IT environment that is consistent with the principle of least privilege typically leads to improved stability, security, and/or scalability of the enterprise IT environment.

Separation of duties is a concept whereby multiple users may be required to complete different tasks in a procedure, process, or workflow. An enterprise IT environment that is consistent with the principle of separation of duties typically leads to improved internal controls (e.g., reduced fraud and/or reduced errors) of the enterprise IT environment.

Properly defining user permissions in accordance with the principle of least privilege and the principle of separation of duties can be difficult. As an enterprise adds more users, properly scaling user permissions is complicated. For example, a growing company may start with a single finance employee before growing to a department of tens of finance employees and then a division of hundreds of finance employees. As the company grows, each individual's role becomes more granular. Accordingly, as an employee's or a user's role becomes more granular, there is a need for a scalable, efficient, and reliable mechanism for defining appropriate permissions. However, this need is not limited solely to organizations experiencing growth. On the contrary, any introduction of increased complexity warrants a scalable, efficient, and reliable access management protocol. For example, changes to laws and/or regulations (e.g., the Health Insurance Portability and Accountability Act (HIPAA), the General Data Protection Regulation (GDPR), etc.) may necessitate increased granularity and/or reliability in defining access permissions in order to comply with the changing laws and/or regulations. These and other challenges demonstrate the need for a readily scalable, efficient, reliable, and portable access management system.

Aspects of the present disclosure are directed to a scalable, efficient, reliable, and portable access management protocol utilizing constrained permissions or constrained roles. Constrained permissions can refer to explicitly rescinded, removed, or denied permissions. Thus, while traditional access management systems can define roles based on explicitly granted permissions, aspects of the present disclosure are directed to further defining roles based on explicitly denied permissions. Furthermore, aspects of the present disclosure relate to combining constrained permissions with granted permissions in order to "trim" or otherwise reduce the granted permissions by removing particular permissions that are shared between the granted permissions and the constrained permissions. This can be an efficient technique for increasing role granularity.

While the discussion thus far has related to individual permissions, granted permissions can also be organized into sets of permissions which can be referred to as roles. Roles can include titles such as administrative roles, auditing roles, engineer roles, and the like. Aspects of the present disclosure are extendable to roles insofar as aspects of the present disclosure can customize permissions by defining a granted role together with a constrained role. In other words, a set of granted permissions (e.g., a granted role) can be merged with a set of constrained permissions (e.g., a constrained role) in order to trim unnecessary privileges associated with the set of granted permissions. In the following, reference may be made to permissions, permission sets, and/or roles, but these terms should not be considered limiting and embodiments exist where, for example, an embodiment described using the term "permission set" may be replaced with the term "role" and the embodiment remains within the spirit and scope of the present disclosure.

In order to better illustrate aspects of the present disclosure, consider a role A (e.g., permission set [A]) that includes a set of permissions such as permissions 1-3 that can be granted to a user profile. Aspects of the present disclosure are directed to defining a constrained role A (e.g., ![A]) which may rescind the set of permissions (e.g., rescind permissions 1-3) from the user profile. A constrained role can be combined with a granted role to define access permissions for a user profile. For example, consider role A (e.g., permission set [A]) with permissions 1-3 and a role B (e.g., permission set [B]) with permissions 2 and 4. For a user profile defined as [A] and constrained [B] (e.g., USER←[A], ![B]), the user can have permissions 1 and 3. In this case, since permission 2 is shared between [B] and [A], and since [B] is defined as a constrained role, aspects of the present disclosure can be configured to remove (e.g., "trim") permission 2 from the permission set [A]. As another example, consider a permission set C with permissions 2 and 5, and a user profile defined as [A], constrained [B], and [C] (e.g., USER←[A], ![B], [C]). This hypothetical role results in the user profile having permission 1 and 3 and 5. Permission 2 is excluded by ![B] despite being included in multiple granted permission sets. Advantageously, a constrained permission supersedes any granted permission regardless of how many times that permission is granted (e.g., a single constrained role precludes a permission even if multiple roles grant the same permission), or at what point in time that permission is granted (e.g., a constrained role precludes a permission even if that permission is granted by a subsequently added role).

Thus, aspects of the present disclosure are directed to a scalable, efficient, reliable, and portable access management protocol utilizing constrained permissions or constrained roles. The access management protocol discussed herein improves efficiency by enabling complex organizations to appropriately designate access permissions using both granted permissions and constrained permissions. Furthermore, the access management protocol discussed herein reduces errors by reducing the amount of manual data entry relative to a traditional system relying exclusively upon granted permissions. Finally, the access management protocol discussed herein can improve scalability by simplifying the definition and maintenance (e.g., modifications) of access permissions.

Referring now to the figures, FIG. 1 illustrates a block diagram of an example access management environment 100, in accordance with some embodiments of the present disclosure. Access management environment 100 includes an enterprise system 102 and a user profile 104 with access permissions to the enterprise system 102. The user profile 104 can be communicatively coupled to the enterprise system 102 by a network 106. Network 106 can be, for example, a wired or wireless network (e.g., an intranet, the Internet, etc.). User profile 104 can be representative of a user terminal such as, but not limited to, a desktop, a laptop, a computer, a tablet, a smartphone, or another electronic device useful to enabling a user profile 104 to access the enterprise system 102. Although not shown, user profile 104 can include a unique identifier (e.g., a name, a sign-in name, an alphanumeric identifier, a serial number, etc.) and/or authentication credentials (e.g., an alphanumeric password, a biometric password, multi-factor authentication credentials, etc.).

Enterprise system 102 can include role definitions 108. The enterprise system 102 can associate a role definition to every user profile associated with the enterprise system 102, where each respective role can define access permissions for a respective user profile. In some embodiments, role definitions 108 can include a policy graph defining respective roles and their associated permissions (as discussed in greater detail with respect to FIGS. 3A and 3B). Enterprise system 102 can further include policy rules engine 110 for enforcing the role definitions 108. Policy rules engine 110 can, for access attempts from user profile 104 to enterprise applications 112 and/or enterprise data 114, verify that the user profile 104 associated with the access attempt includes appropriate permissions for the access attempt. Access attempts can relate to, for example, accessing, reading, writing (e.g., modifying), downloading, or otherwise interacting with enterprise applications 112 and/or enterprise data 114.

Enterprise applications 112 can include, for example, programs, portals, applications, and the like that are associated with data, processes, procedures, protocols, strategies, and/or other information that is specific to the enterprise system 102. Enterprise data 114 can include, for example, documents, databases, and/or other data that is specific to the enterprise system 102. Although shown separately, in some cases the enterprise applications 112 and the enterprise data 114 are combined with one another or otherwise integrated together.

User profile 104 is communicatively coupled to the enterprise system 102 and is configured to interact with enterprise applications 112 and/or enterprise data 114. User profile 104 is associated with one of the role definitions 108 in the enterprise system 102 that defines the permissions for accessing enterprise applications 112 and/or enterprise data 114 for the user profile 104. More specifically, the user profile 104 includes both granted permissions 116 and constrained permissions 118. Granted permissions 116 can refer to explicitly authorized permissions. Constrained permissions 118 can refer to explicitly removed (e.g., prohibited, rescinded, revoked, etc.) permissions. Constrained permissions 118 can remove one or more of the granted permissions 116. In other words, constrained permissions 118 can supersede granted permissions 116 so that for any permission included in both granted permissions 116 and constrained permissions 118, that permission is revoked. Thus, constrained permissions 118 can be used to "trim" granted permissions 116.

As is understood by one skilled in the art, granted permissions 116 can be bundled together (e.g., collected in sets of granted permissions, such as roles) so that many tens or hundreds of different types of permissions can be associated with each of the role definitions 108. However, this can result in coarsely defined permissions. Using constrained permissions 118 to "trim" the granted permissions 116 provides an efficient mechanism for fine-tuning access permissions for different user profiles. The combination of granted permissions 116 and constrained permissions 118 in user profile 104 is discussed in more detail hereinafter with respect to FIGS. 2A and 2B.

Figure 2A:
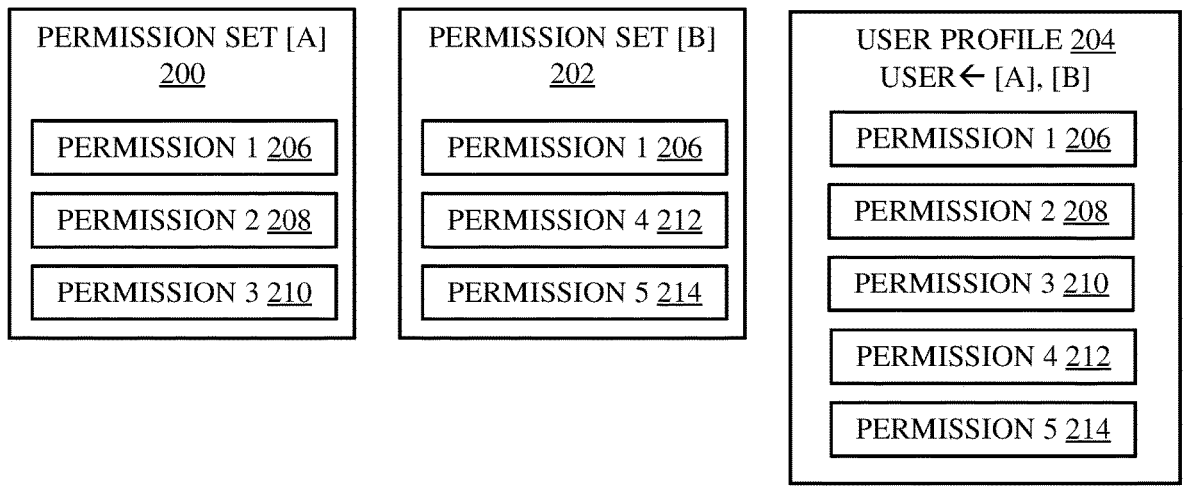
FIG. 2A illustrates a block diagram of an example merged permission set of granted permissions, in accordance with some embodiments of the present disclosure.

FIG. 2A illustrates an example of merged permissions with granted permission sets, in accordance with some embodiments of the present disclosure. Permission set [A] 200 can include permission 1 206, permission 2 208, and permission 3 210. Meanwhile, permission set [B] 202 can include permission 1 206, permission 4 212, and permission 5 214. User profile 204 can be defined as the combination of both permission set [A] 200 and permission set [B] 202 (e.g., USER←([A], [B])). Thus, user profile 204 includes permission 1 206, permission 2 208, permission 3 210, permission 4 212, and permission 5 214. In other words, user profile 204 includes all permissions defined in permission set [A] 200 and all permissions defined in permission set [B] 202.

Figure 2B:
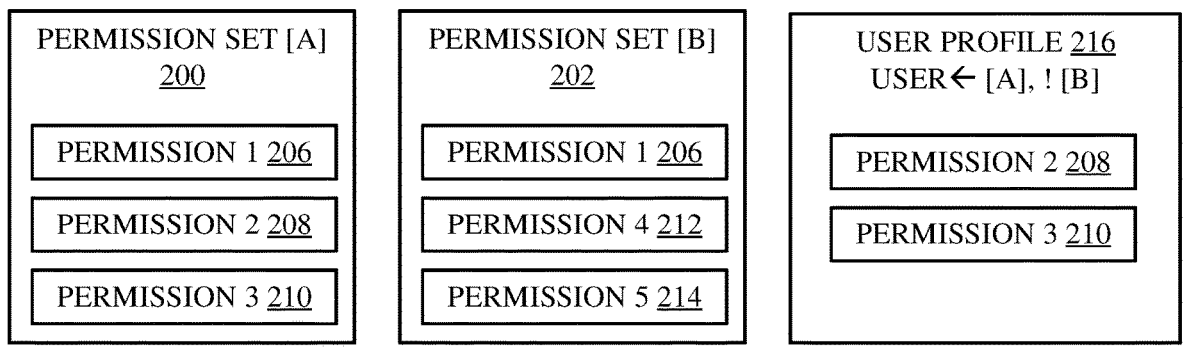
FIG. 2B illustrates a block diagram of an example merged permission set with constrained permissions and granted permissions, in accordance with some embodiments of the present disclosure.

FIG. 2B illustrates an example of merged permissions with granted permission sets and constrained permission sets, in accordance with some embodiments of the present disclosure. Permission set [A] 200 and permission set [B] 202 are consistent with the permission sets described above in FIG. 2A. However, user profile 216 is defined as granted permission set [A] 200 and constrained permission set [B] 202 (e.g., USER←([A], ![B])). Thus, permission set [A] 200 is trimmed by permission set [B] 202. In other words, for any shared permission between permission set [A] 200 and permission set [B] 202 (e.g., permission 1 206), the shared permission is removed from the user profile 216. Accordingly, permission 1 206 is not included in user profile 216 because it is included in both the permission set [A] 200 and the permission set [B] 202, and the permission set [B] 202 is characterized as a constrained permission set. It should be noted that permission 1 206 would not be included in user profile 216 even if permission 1 206 is included in multiple granted permission sets or a subsequently added granted permission set (not shown). Furthermore, user profile 216 includes permission 2 208 and permission 3 210 because permission 2 208 and permission 3 210 are included in the granted permission set (e.g., permission set [A] 200) and are not included in the constrained permission set (e.g., permission set [B] 202). Finally, although the constrained permission set [B] 202 includes permission 4 212 and permission 5 215, these constrained permissions have no noticeable effect on the user profile 216 because they are not included in any granted permission set such as the granted permission set [A] 200.

As will be appreciated by one skilled in the art, to define user profile 216 as discussed in FIG. 2B using traditional methods (e.g., combinations of explicitly defined granted permissions) such as discussed in FIG. 2A would require definition of a new permission set (e.g., a permission set [C]) including only permission 2 208 and permission 3 210. For user profiles defined by many tens or hundreds of different permissions, manually defining a new permission set for specific roles is time-consuming and prone to errors. Accordingly, aspects of the present disclosure are directed to an access management protocol that is scalable, efficient, and less prone to errors as a result of using constrained permission sets to trim unnecessary permissions from granted permission sets as shown in FIG. 2B.

Figure 3A:
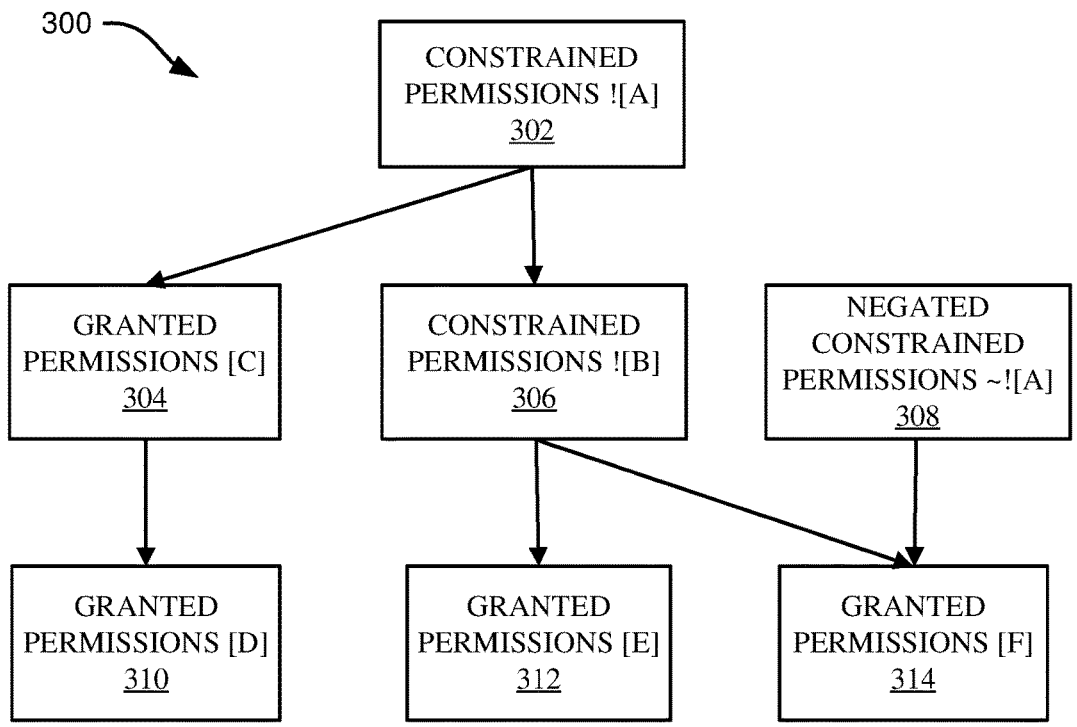
FIG. 3A illustrates a block diagram of an example policy graph having granted permissions and constrained permissions, in accordance with embodiments of the present disclosure.

Referring now to FIG. 3A, illustrated is a block diagram of an example policy graph 300 including granted permissions and constrained permissions, in accordance with some embodiments of the present disclosure. Policy graph 300 can be configured to define roles based on a path through the policy graph 300 and/or based on relationships between permission sets (e.g., nodes) in the policy graph 300. Policy graph 300 includes constrained permissions ![A] 302, granted permissions [C] 304, constrained permissions ![B] 306, negated constrained permissions ~![A] 308, granted permissions [D] 310, granted permissions [E] 312, and granted permissions [F] 314. As shown in policy graph 300, the different components of policy graph 300 are interrelated by arrows. Aspects of the present disclosure are directed to defining a user profile having both granted permissions and constrained permissions based on relationships between nodes in the policy graph 300.

For example, a first example user profile can be manually associated with granted permissions [D] 310. Aspects of the present disclosure are directed to accessing policy graph 300 and automatically retrieving granted permissions [C] 304 and constrained permissions ![A] 302 based on the path interrelating granted permissions [D] 310, granted permissions [C] 304, and constrained permissions ![A] 302 in the policy graph 300. Thus, the first example user profile can be defined as $1^{ST}$ EXAMPLE USER PROFILE←[D], [C], ![A].

A second example user profile can be manually associated with granted permissions [E] 312. Similarly to the above, aspects of the present disclosure can access policy graph 300 and automatically associate constrained permissions ![B] 306 and constrained permissions ![A] 302 with the second example user profile. Thus, the second example user profile can be defined as $2^{ND}$ EXAMPLE USER PROFILE←[E], ![B], ![A].

A third example user profile can be manually associated with granted permissions [F] 314. Similarly to the above, aspects of the present disclosure can access policy graph 300 and automatically associate constrained permissions ![B] 306 and constrained permissions ![A] 302 with the third example user profile. Furthermore, granted permissions [F] 314 is associated with negated constrained permission ~![A] 308 in the policy graph 300. Negated constrained permission ~![A] 308 can be configured to negate, nullify, or cancel constrained permissions ![A] 302. Thus, the third example user profile can be defined as $3^{RD}$ EXAMPLE USER PROFILE←![B], [F].

Thus, FIG. 3A demonstrates that access permissions for user profiles can be defined using a policy graph 300, where defining an initial permission set can automatically associate other granted permissions sets, constrained permission sets, and/or negated constrained permission sets with the user profile based on the policy graph 300. Policy graph 300 can thus lead to efficient characterization of user profiles, and/or scalable maintenance of all user profiles. These benefits may be particularly pronounced in a policy graph having thousands of nodes defining hundreds of roles, for example. The policy graph 300 of FIG. 3A is a simplified policy graph that is shown for representative purposes, and it should not be construed as limiting.

Figure 3B:
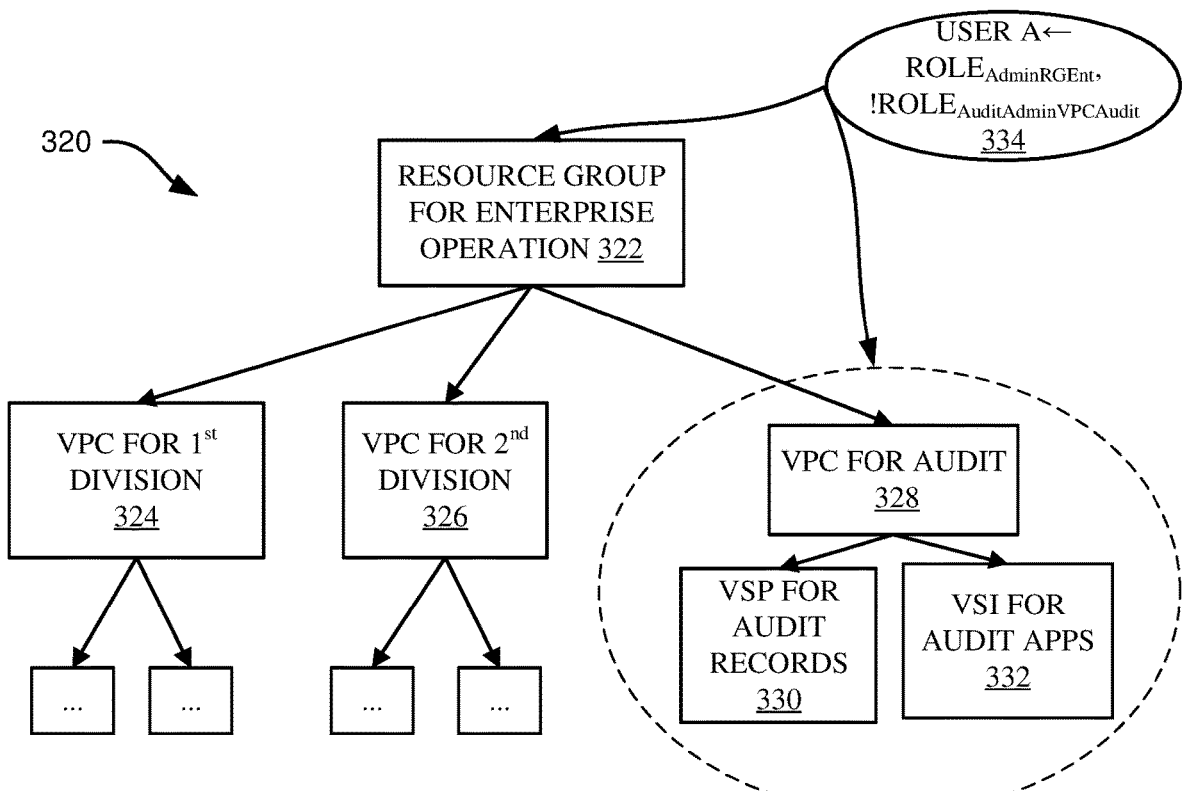
FIG. 3B illustrates a block diagram of an example hierarchical policy graph having granted roles and constrained roles, in accordance with embodiments of the present disclosure.

Referring now to FIG. 3B, illustrated is an example hierarchical policy graph 320, in accordance with some embodiments of the present disclosure. Hierarchical policy graph 320 can include a directed graph representing various roles and their relationships between one another. In other words, while FIG. 3A illustrated roles defined as paths through a policy graph 300, FIG. 3B illustrates roles defined as nodes in a hierarchical policy graph 320, where each node represents a role having a set of permissions including permissions associated with every sub-role (e.g., sub-node) in the hierarchical policy graph 320.

As will be appreciated by one skilled in the art, the hierarchical policy graph 320 is a simplified and non-limiting example of a portion of an abbreviated policy graph. In many applications of the present disclosure, a policy graph 320 can contain hundreds of nodes spanning many layers. Likewise, the particular names associated with individual nodes in hierarchical policy graph 320 are shown purely for illustrative purposes and other names/roles can be defined with nodes in other applications of the hierarchical policy graph 320.

Hierarchical policy graph 320 can include a top node (e.g., root node) representing a resource group for enterprise operation 322. The resource group for enterprise operation 322 can include directional arrows to, for example, a virtual private cloud (VPC) for a first division 324 (e.g., a business unit), a VPC for a second division 326, and a VPC for auditing purposes 328. Although not shown in detail, the VPC for the first division 324 and the VPC for the second division 326 can each include many more dependencies and layers which are not shown here for brevity and clarity. The VPC for auditing purposes 328 can include a virtual storage portal (VSP) for audit records 330 and a virtual server infrastructure (VSI) for audit applications 332.

As shown in FIG. 3B, constraints can be used to remove portions of the policy graph 320 for certain roles. For example, a role 334 for a user A can be defined as USER A←Role$_{AdminRGEnt}$, !Role$_{AuditAdminVPCAudit}$ where Role$_{AdminRGEnt}$ can refer to all permissions associated with resource group for enterprise operation 322 and where Role$_{AuditAdminVPCAudit}$ can be associated with a set of permissions shown in the dashed circle including VPC for auditing purposes 328, VSP for audit records 330, and VSI for audit applications 332. Thus, USER A←Role$_{AdminRGEnt}$, !Role$_{AuditAdminVPCAudit}$ can define a role including all permissions associated with resource group for enterprise operation 322 and excluding permissions associated with VPC for auditing purposes 328 and permissions below VPC for auditing purposes 328 in the policy graph 320.

Advantageously, the policy graph 320 exhibits the ability of aspects of the present disclosure to define roles by explicitly excluding (using constrained sub-roles such as !Role$_{AuditAdminVPCAudit}$) specific sub-roles from a role hierarchy. This improves efficiency, reliability, and scalability in role definitions. For example, efficiency is improved by efficiently trimming unnecessary privileges from a granted role using a constrained sub-role. Reliability is improved because there is a reduction in manual errors due to the reduction in manual data entry as discussed above regarding the improvement in efficiency. Furthermore, the exclusion of permissions represented by the constrained sub-role remains ensured even if other roles with some same permissions are granted to the user either intentionally or unintentionally. In other words, for a first permission, if a user role is defined to include the first permission as a constrained permission and the first permission as a granted permission, the constrained permission supersedes the granted permission regardless of the number of times the first permission is granted or when the first permission is defined as a granted permission. Scalability is improved insofar as individual permissions within each sub-role can be modified, and the modifications can automatically be applied to every role associated with that sub-role (e.g., either as a granted sub-role or a constrained sub-role).

For example, imagine a situation where, instead of three sub-roles below the resource group for enterprise operation 322 (e.g., 324, 326, and 328), there are instead tens or hundreds of sub-roles. In such a situation, to explicitly exclude the VPC for auditing purposes 328, a traditional methodology would require manually entering each of the tens or hundreds of sub-roles except for the VPC for auditing purposes 328. Such a traditional approach is inefficient, prone to errors, and difficult to maintain and/or scale.

Figure 4:
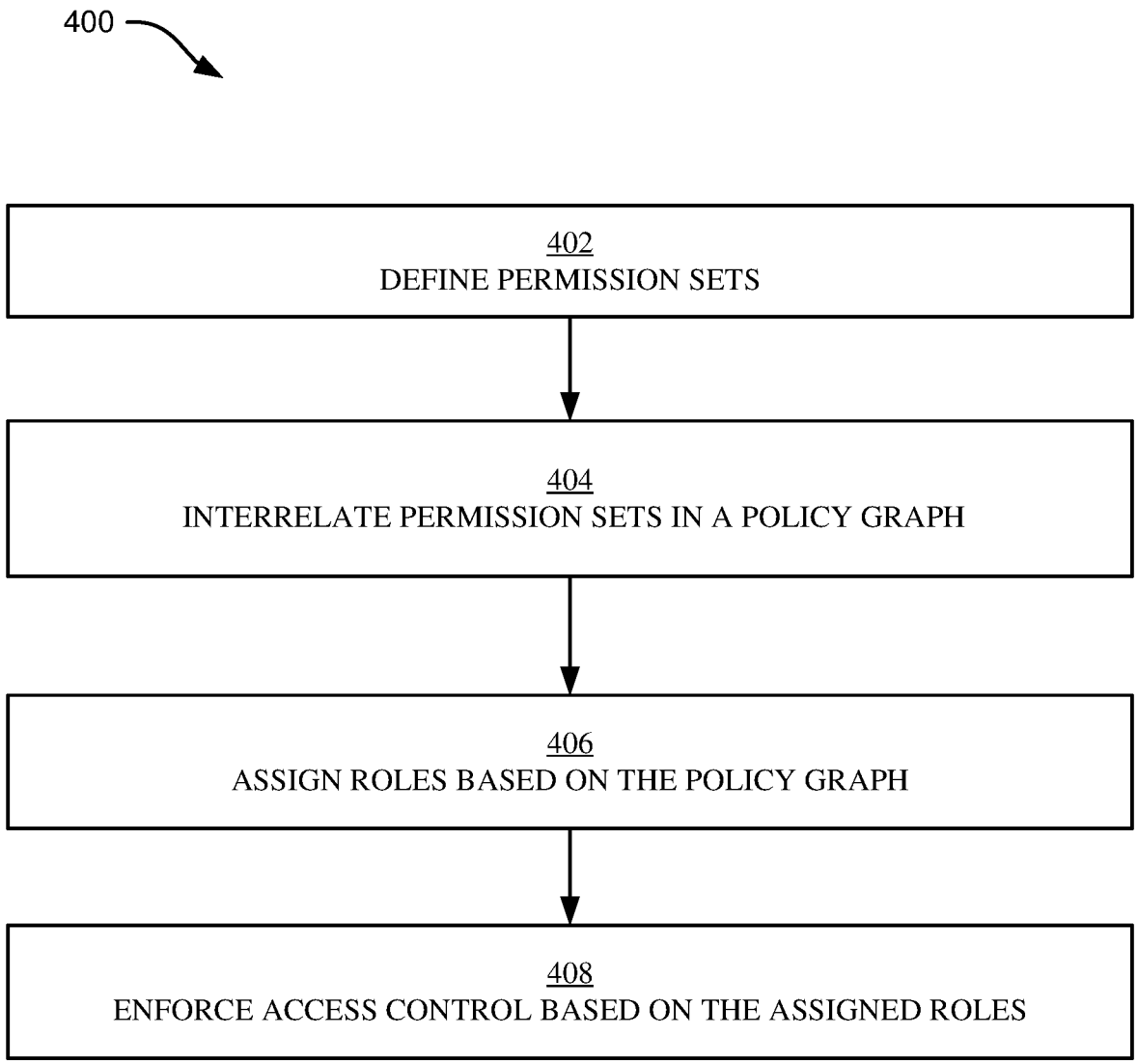
FIG. 4 illustrates a flowchart of an example method for associating granted permissions and constrained permissions to a user profile, in accordance with embodiments of the present disclosure.

FIG. 4 illustrates a flowchart of an example method 400 for defining granted permissions and constrained permissions for a user profile, in accordance with some embodiments of the present disclosure. In some embodiments, the method 400 can be implemented by an enterprise system 102, a processor executing computer-readable program instructions, or another combination of hardware and/or software.

Operation 402 includes defining permission sets. Each permission set can include one or more permissions, where each permission defines at least one privilege (e.g., read, write, download, etc.) and at least one resource (e.g., a portion of enterprise applications 112 or enterprise data 114).

Operation 404 includes interrelating the permission sets in a policy graph such as policy graph 300 of FIG. 3A or hierarchical policy graph 320 of FIG. 3B. When permission sets are interrelated as in policy graph 300 of FIG. 3A, each node can be defined as a granted permission set, a constrained permission set, or a negated constrained permission set, and a role for a user profile can be defined as a path through a set of related nodes in the policy graph 300. In contrast, when permission sets are interrelated as in hierarchical policy graph 320 of FIG. 3B, each node can represent a role having permissions assigned to that node and including permissions assigned to each sub-node (e.g., sub-role) that is related to that node.

Operation 406 includes assigning granted permissions and constrained permissions to a user profile based on the policy graph. Operation 406 can include determining granted permissions, constrained permissions, and/or negated constrained permissions based on a series of nodes interrelated in a policy graph 300, or operation 406 can include determining granted permissions and constrained permissions based on a node and one or more constrained sub-nodes in a hierarchical policy graph 320. For example, consistent with the policy graph 300 of FIG. 3A, a user profile can be defined by selecting an initial permission set and associating other granted permission sets, constrained permission sets, and/or negated constrained permission sets to the user profile according to the policy graph 300. As another example, consistent with the policy graph 320 of FIG. 3B, a user profile can be defined by selecting a portion of a policy graph 320 and excluding one or more sub-portions of the selected portion of the policy graph 320 using constrained roles.

Operation 408 includes enforcing access control based on the assigned roles. Enforcing access control can include, for an access attempt, determining if the access attempt is allowed by at least one granted permission and that the access attempt is not disallowed by any constrained permission. An example of operation 408 is discussed in more detail hereinafter with respect to FIG. 5.

Figure 5:
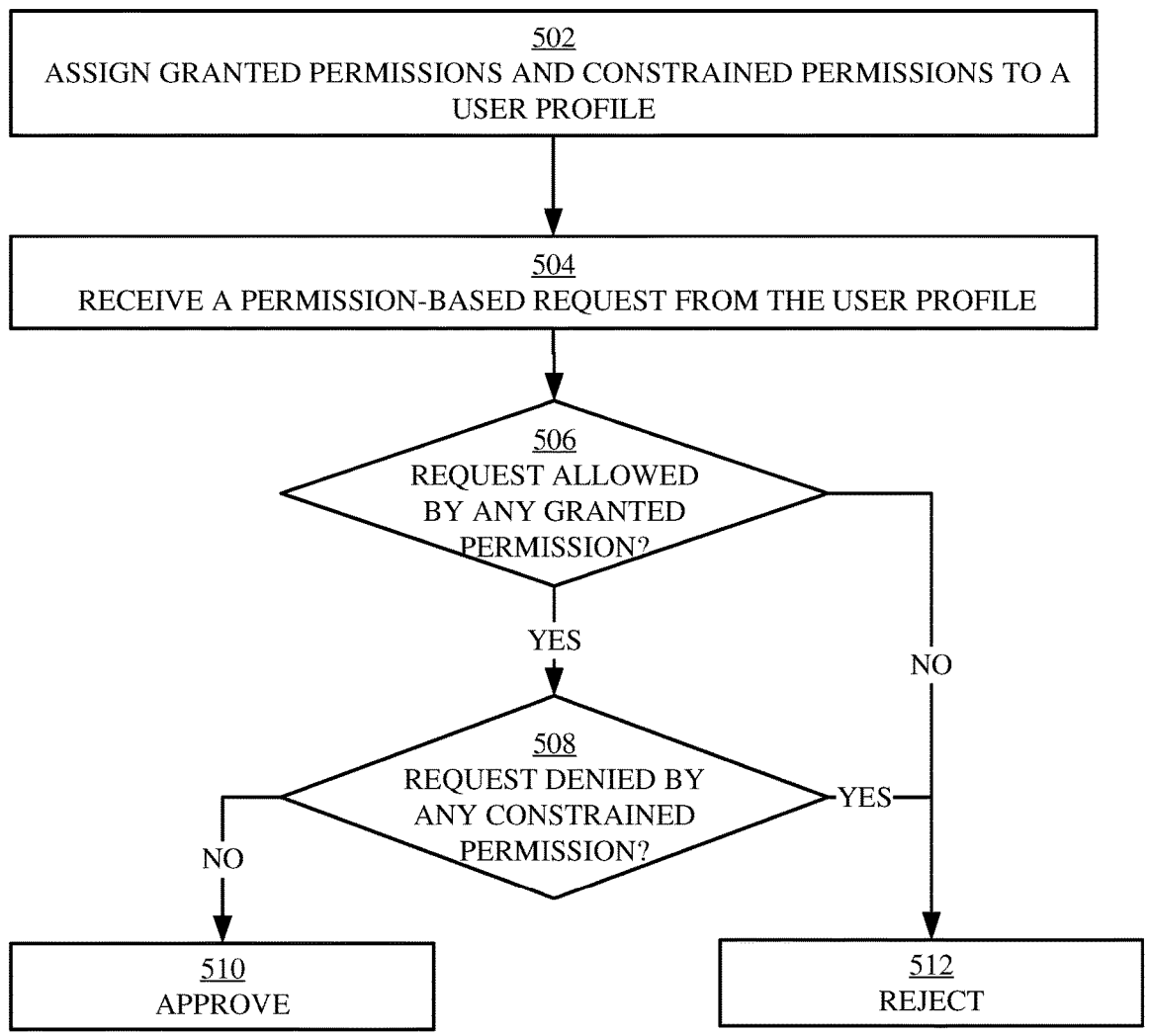
FIG. 5 illustrates a flowchart of an example method for enforcing granted permissions and constrained permissions in an access management system, in accordance with some embodiments of the present disclosure.

Referring now to FIG. 5, illustrated is a flowchart of an example method 500 for access management using both granted permissions and constrained permissions. In some embodiments, the method 500 can be implemented by an enterprise system 102, a processor executing computer-readable program instructions, or another combination of hardware and/or software.

Operation 502 includes assigning granted permissions and constrained permissions to a user profile. In some embodiments, the granted permissions and the constrained permissions are assigned using a policy graph such as policy graph 300 of FIG. 3A or hierarchical policy graph 320 of FIG. 3B. In some embodiments, operation 502 is consistent with operations 402-406 of FIG. 4.

Operation 504 includes receiving a permission-based request from the user profile. For example, the permission-based request may include a request to access, read, create, modify, download, or otherwise interact with enterprise data. As another example, the permission-based request may include a request to access, utilize, or otherwise interact with an enterprise application.

Operation 506 includes determining if the request is allowed by any granted permission. If not (506: NO), the method 500 proceeds to operation 512 and rejects the request. If so (506: YES), the method 500 proceeds to operation 508.

Operation 508 includes determining if the request is denied by any constrained permission. If so (508: YES), the method 500 proceed to operation 512 and rejects the request. If not (508: NO), the method 500 proceeds to operation 510 and approves the request.

As can be seen in FIG. 5, aspects of the present disclosure are configured to efficiently determine if a permission-based request is authorized based on granted permissions and constrained permissions associated with the user profile. More specifically, a request is authorized when the request is associated with a permission that satisfies both conditions specified below:

(1) the permission is one of the granted permissions in the user profile; and (2) the permission is not one of the constrained permissions in the user profile.

Conversely, a request is rejected when the request is associated with a permission which satisfies either of the conditions specified below:

(1) the permission is not one of the granted permissions associated with the user profile; or (2) the permission is one of the granted permissions associated with the user profile and is one of the constrained permissions associated with the user profile.

Figure 6:
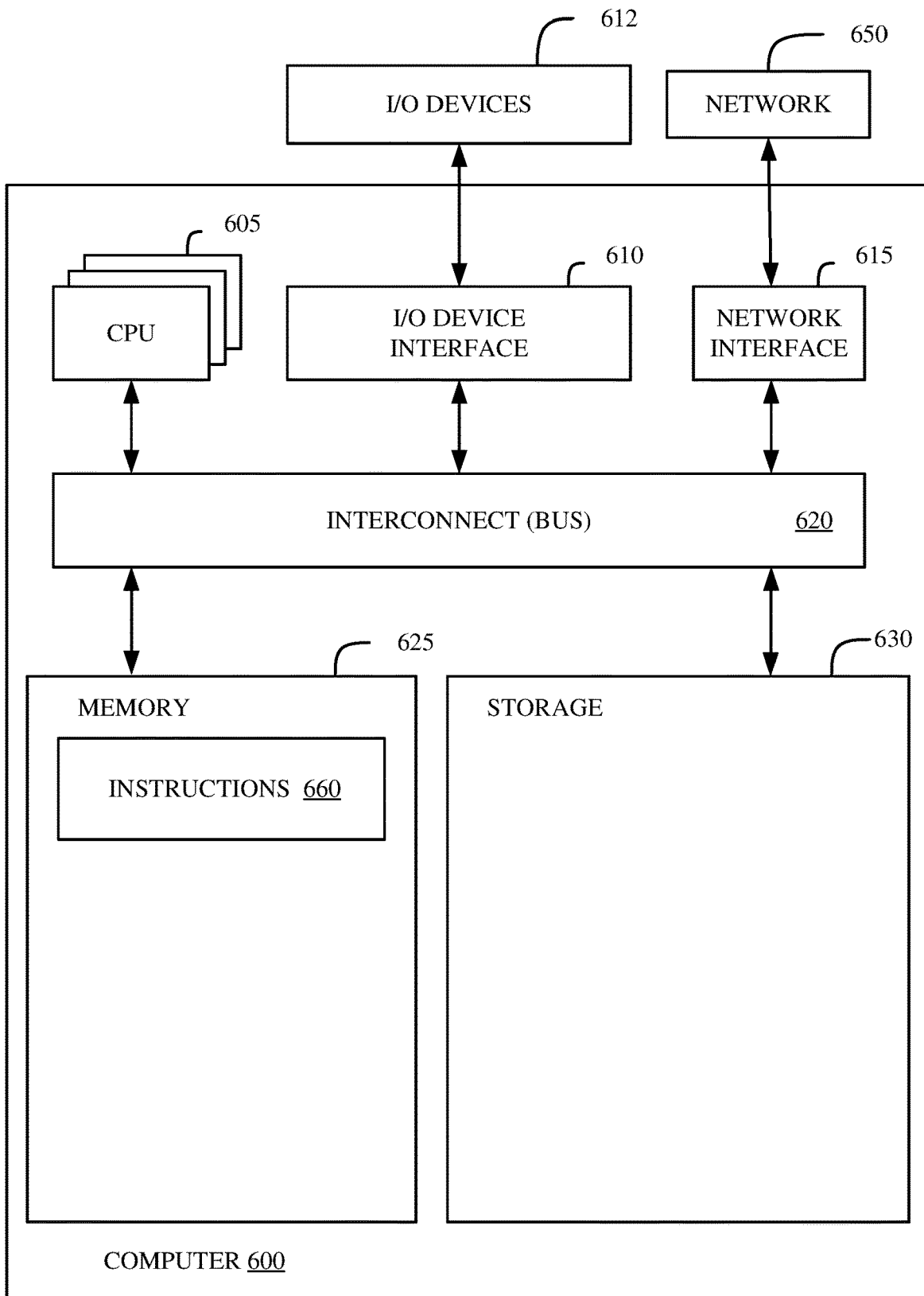
FIG. 6 illustrates a block diagram of an example computer, in accordance with some embodiments of the present disclosure.

FIG. 6 illustrates a block diagram of an example computer 600 in accordance with some embodiments of the present disclosure. In various embodiments, computer 600 can perform the methods described in any one or more of FIGS. 4-5 and/or implement the functionality discussed in any one of FIGS. 1, 2A-2B, and/or 3A-3B. In some embodiments, computer 600 receives instructions related to the aforementioned methods and functionalities by downloading processor-executable instructions from a remote data processing system via network 650. In other embodiments, computer 600 provides instructions for the aforementioned methods and/or functionalities to a client machine such that the client machine executes the method, or a portion of the method, based on the instructions provided by computer 600. In some embodiments, the computer 600 is incorporated into (or functionality similar to computer 600 is virtually provisioned to) any one or more of the enterprise system 102, the user profile 104, an access management system, or another aspect of the present disclosure.

Computer 600 includes memory 625, storage 630, interconnect 620 (e.g., BUS), one or more CPUs 605 (also referred to as processors herein), I/O device interface 610, I/O devices 612, and network interface 615.

Each CPU 605 retrieves and executes programming instructions stored in memory 625 or storage 630. Interconnect 620 is used to move data, such as programming instructions, between the CPUs 605, I/O device interface 610, storage 630, network interface 615, and memory 625. Interconnect 620 can be implemented using one or more busses. CPUs 605 can be a single CPU, multiple CPUs, or a single CPU having multiple processing cores in various embodiments. In some embodiments, CPU 605 can be a digital signal processor (DSP). In some embodiments, CPU 605 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 625 is generally included to be representative of a random-access memory (e.g., static random-access memory (SRAM), dynamic random access memory (DRAM), or Flash). Storage 630 is generally included to be representative of a non-volatile memory, such as a hard disk drive, solid state device (SSD), removable memory cards, optical storage, or flash memory devices. In an alternative embodiment, storage 630 can be replaced by storage area-network (SAN) devices, the cloud, or other devices connected to computer 600 via I/O device interface 610 or network 650 via network interface 615.

In some embodiments, memory 625 stores instructions 660. However, in various embodiments, instructions 660 are stored partially in memory 625 and partially in storage 630, or they are stored entirely in memory 625 or entirely in storage 630, or they are accessed over network 650 via network interface 615.

Instructions 660 can be computer-readable and computer-executable instructions for performing any portion of, or all of, any of the methods of FIGS. 4-5 and/or implementing any of the functionality discussed in FIGS. 1, 2A-2B, and/or 3A-3B. In some embodiments, instructions 660 can be referred to as access management protocol instructions or simply an access management protocol.

In various embodiments, I/O devices 612 include an interface capable of presenting information and receiving input. For example, I/O devices 612 can present information to a user interacting with computer 600 and receive input from the user.

Computer 600 is connected to network 650 via network interface 615. Network 650 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
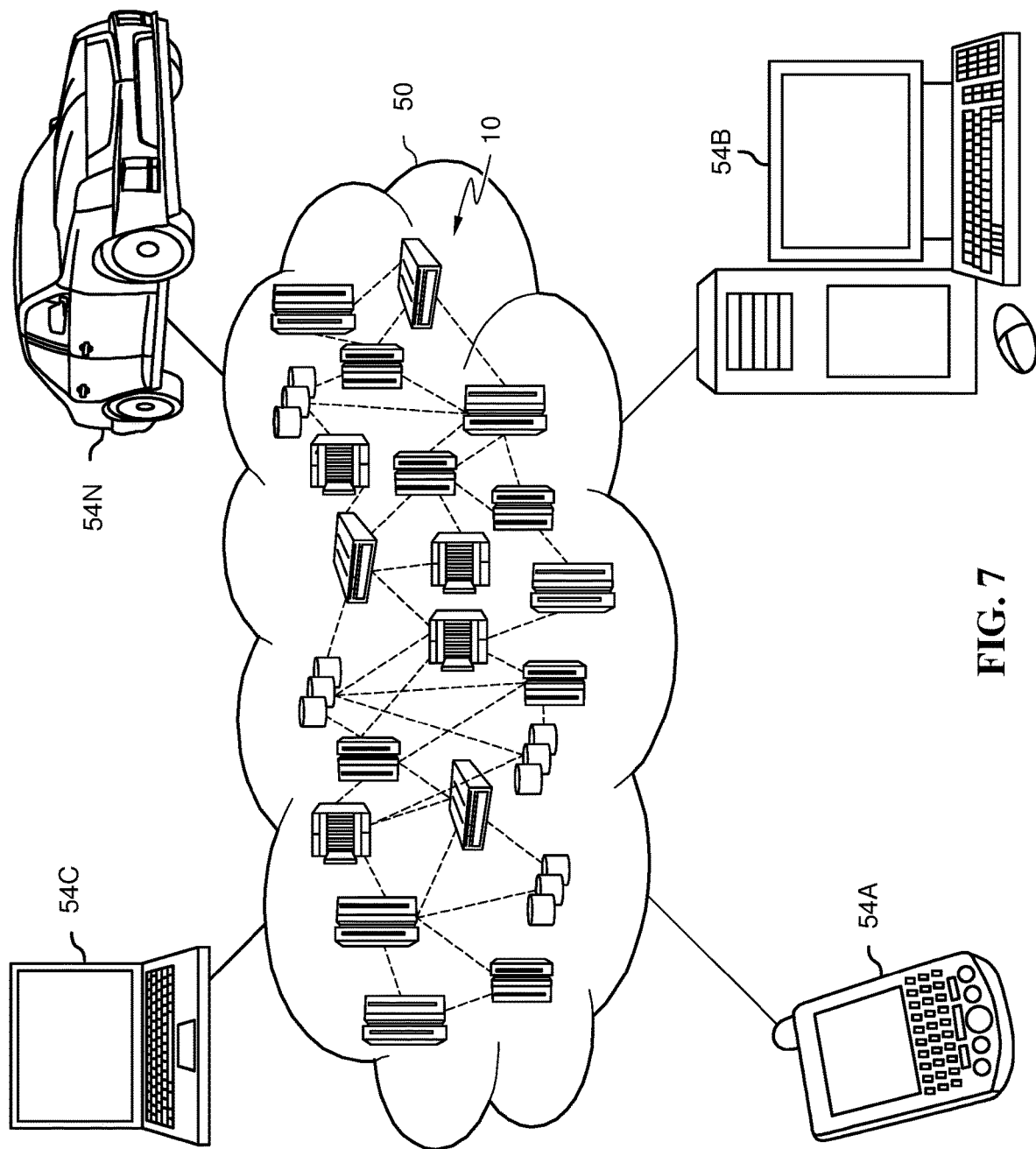
FIG. 7 depicts a cloud computing environment, in accordance with some embodiments of the present disclosure.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
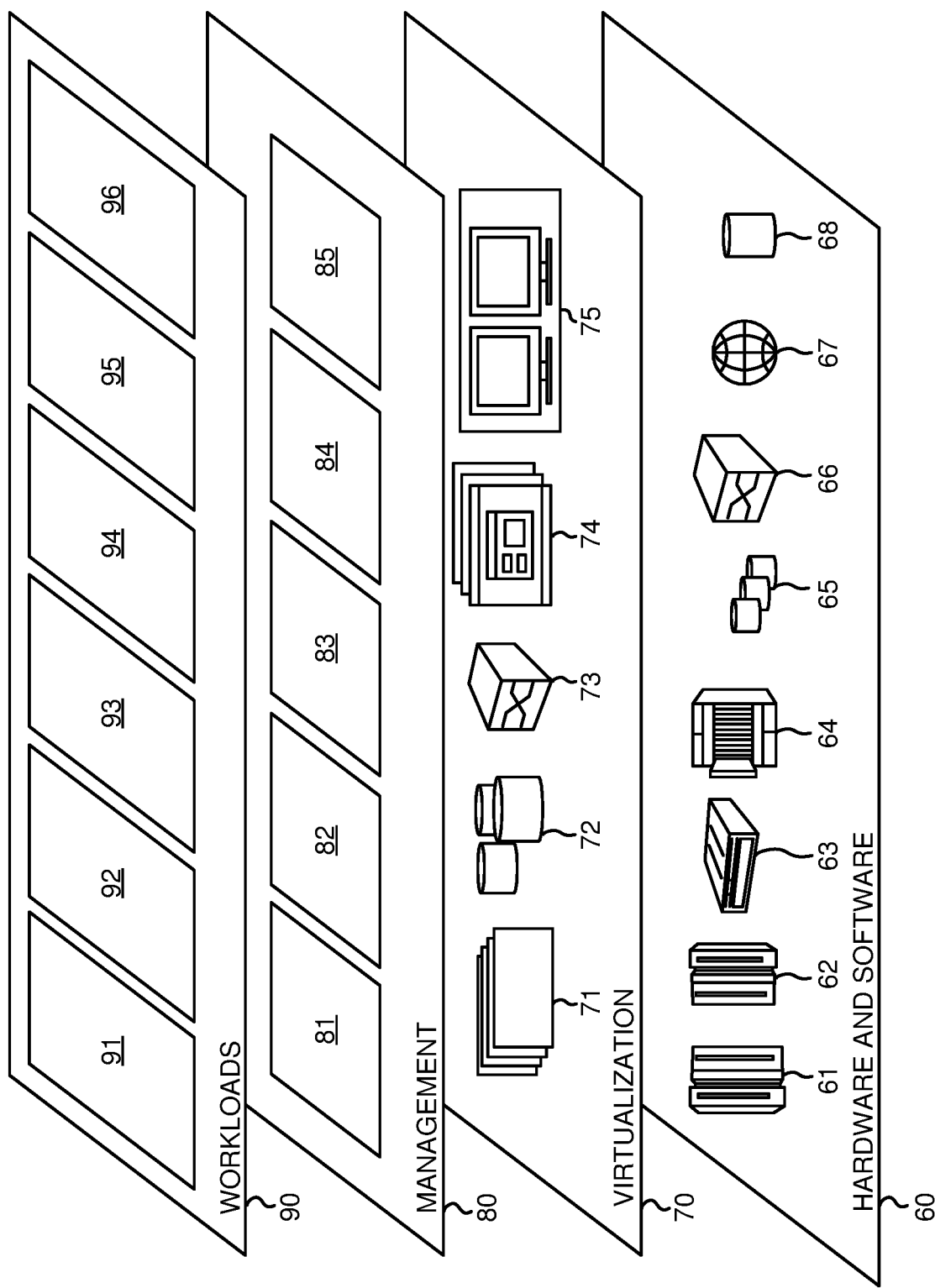
FIG. 8 depicts abstraction model layers, in accordance with some embodiments of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and access management 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 660 of FIG. 6 and/or any software configured to perform any subset of the methods described with respect to FIGS. 4-5 and/or any of the functionality discussed in FIGS. 1, 2A-2B, and/or 3A-3B) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

What is claimed is:

1. A method for an access management protocol, the method comprising:
    associating a granted permission set and a constrained permission set to a user profile in an access management system comprising a processor and a non-transitory memory, wherein respective granted permissions in the granted permission set authorize the user profile to perform the respective granted permissions, wherein respective constrained permissions in the constrained permission set preclude the user profile from performing the respective constrained permissions, wherein the constrained permission set supersedes the granted permission set, wherein the granted permission set is a first node in a policy graph including permissions for sub-nodes of the first node in the policy graph, and wherein the constrained permission set is a first sub-node of the first node;
    receiving a permission-based request at the access management system and from the user profile;
    determining, by the access management system, that the permission-based request is associated with a permission that is included in both the granted permission set and the constrained permission set; and
    rejecting, by the access management system, the permission-based request based on the policy graph and the constrained permission set superseding the granted permission set for the permission.

2. The method of claim 1, wherein the permission is associated with multiple permissions in the granted permission set and a single permission in the constrained permission set.

3. The method of claim 2, wherein the single permission in the constrained permission set and one of the multiple permissions in the granted permission set are associated with the user profile at an initial time, and wherein another one of the multiple permissions in the granted permission set is associated with the user profile at a later time.

4. The method of claim 1, further comprising:
    receiving a second permission-based request at the access management system and from the user profile;
    determining, by the access management system, that the second permission-based request is allowed by at least one permission from the granted permission set and not denied by any permission from the constrained permission set; and
    approving, by the access management system, the second permission-based request.

5. The method of claim 1, wherein associating the granted permission set and the constrained permission set to the user profile in the access management system further comprises:
    associating the granted permission set to the user profile;
    determining that the granted permission set is associated with the constrained permission set based on the policy graph; and
    associating the constrained permission set to the user profile.

6. The method of claim 5, wherein the policy graph includes a second constrained permission set and a negated second constrained permission set, and wherein the method further comprises:
    receiving a second permission-based request at the access management system and from the user profile;
    determining, by the access management system, that the second permission-based request is associated with a permission that is included in the granted permission set, the constrained permission set, and the negated second constrained permission set; and
    approving, by the access management system, the second permission-based request.

7. The method of claim 1, wherein the constrained permission set is related to the granted permission set in a directed graph.

8. The method of claim 1, wherein the access management protocol is a role-based access control (RBAC) protocol.

9. The method of claim 1, wherein the access management protocol comprises software that is downloaded to the access management system from a remote data processing system.

10. The method of claim 9, wherein the method further comprises:
    metering a usage of the access management protocol; and
    generating an invoice based on metering the usage.

11. An access management system comprising:
    a processor; and
    a computer-readable storage medium storing access management protocol instructions which, when executed by the processor, are configured to cause the processor to perform a method comprising:
    associating a granted permission set and a constrained permission set to a user profile in an access management system, wherein respective granted permissions in the granted permission set authorize the user profile to perform the respective granted permissions, and wherein respective constrained permissions in the constrained permission set preclude the user profile from performing the respective constrained permissions, wherein the constrained permission set supersedes the granted permission set, wherein the granted permission set is a first node in a policy graph including permissions for sub-nodes of the first node in the policy graph, and wherein the constrained permission set is a first sub-node of the first node;
    receiving a permission-based request at the access management system and from the user profile;
    determining, by the access management system, that the permission-based request is associated with a permission that is included in both the granted permission set and the constrained permission set; and
    rejecting, by the access management system, the permission-based request based on the policy graph and the constrained permission set superseding the granted permission set for the permission.

12. The access management system of claim 11, wherein the permission is associated with multiple permissions in the granted permission set and a single permission in the constrained permission set.

13. The access management system of claim 12, wherein the single permission in the constrained permission set and one of the multiple permissions in the granted permission set are associated with the user profile at an initial time, and wherein another one of the multiple permissions in the granted permission set is associated with the user profile at a later time.

14. The access management system of claim 11, wherein the access management protocol is a role-based access control (RBAC) protocol.

15. The access management system of claim 11, wherein associating the granted permission set and the constrained permission set to the user profile in the access management system further comprises:
- associating the granted permission set to the user profile;
- determining that the granted permission set is associated with the constrained permission set based on the policy graph; and
- associating the constrained permission set to the user profile.

16. The access management system of claim 11, wherein the constrained permission set is related to the granted permission set in a directed graph.

17. A computer program product comprising a computer readable storage medium having access management protocol instructions embodied therewith, the access management protocol instructions when executed by an access management system to cause the access management system to perform a method comprising:
- associating a granted permission set and a constrained permission set to a user profile in the access management system, wherein respective granted permissions in the granted permission set authorize the user profile to perform the respective granted permissions, and wherein respective constrained permissions in the constrained permission set preclude the user profile from performing the respective constrained permissions, wherein the constrained permission set supersedes the granted permission set, wherein the granted permission set is a first node in a policy graph including permissions for sub-nodes of the first node in the policy graph, and wherein the constrained permission set is a first sub-node of the first node;
- receiving a permission-based request at the access management system and from the user profile;
- determining, by the access management system, that the permission-based request is associated with a permission that is included in both the granted permission set and the constrained permission set; and
- rejecting, by the access management system, the permission-based request based on the policy graph and the constrained permission set superseding the granted permission set for the permission.

18. The computer program product of claim 17, wherein the access management protocol comprises software that is downloaded to the access management system from a remote data processing system, and wherein the method further comprises:
- metering a usage of the access management protocol; and
- generating an invoice based on metering the usage.

\* \* \* \* \*